Jan. 7, 1969 A. E. FELT 3,420,032
LOCKING LANCE TAB PRE-ASSEMBLY OF BOX-SECTION FRAME MEMBER
Filed Sept. 29, 1965
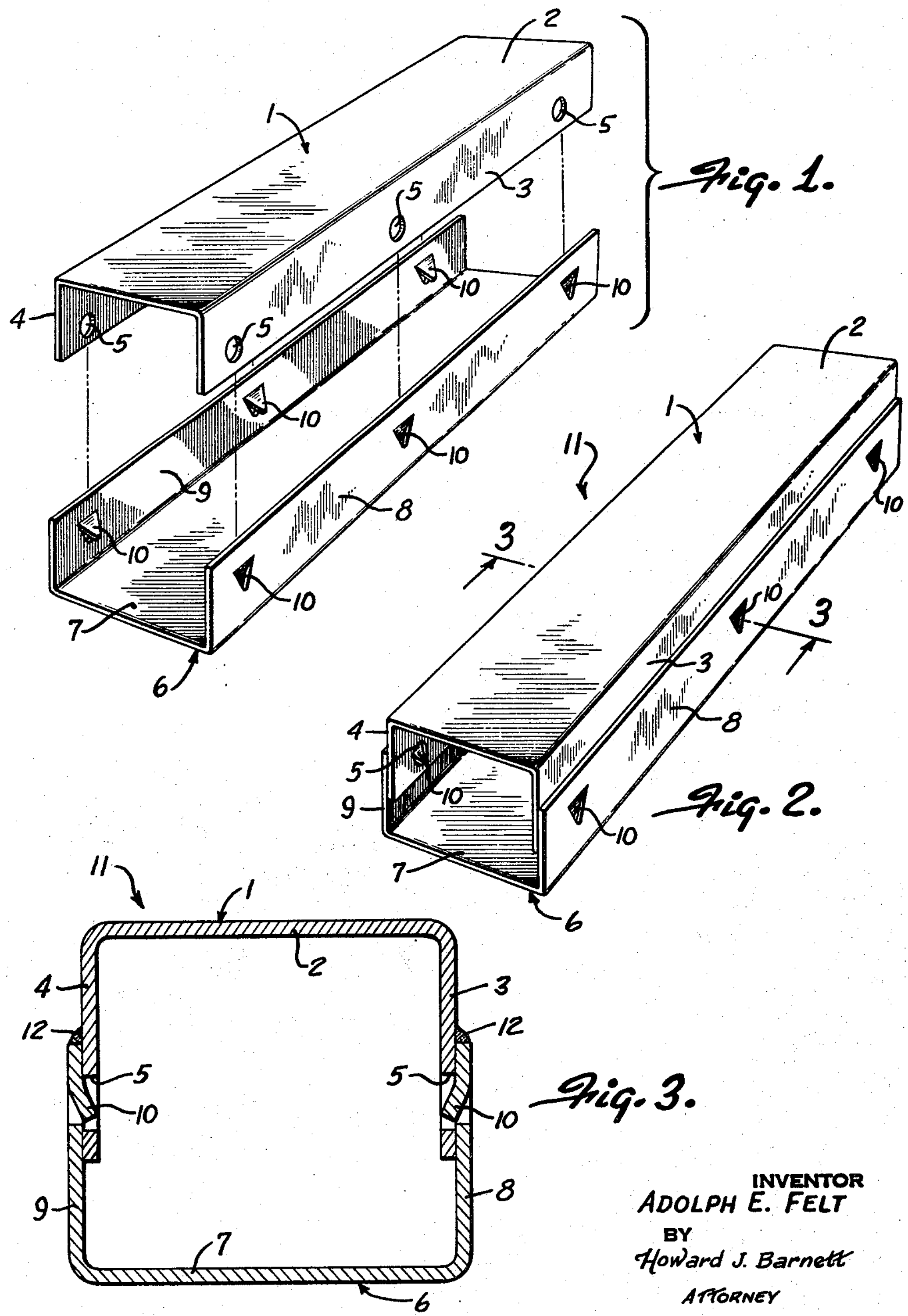
INVENTOR
ADOLPH E. FELT
BY
Howard J. Barnett
ATTORNEY United States Patent Office 3,420,032

Patented Jan. 7, 1969

3,420,032

LOCKING LANCE TAB PRE-ASSEMBLY OF BOX-SECTION FRAME MEMBER

Adolph E. Felt, Milwaukee, Wis., assignor to A. O. Smith Corporation, Milwaukee, Wis., a corporation of New York Filed Sept. 29, 1965, Ser. No. 491,366

U.S. Cl. 52—731 6 Claims

Int. Cl. E04c *3/32*

ABSTRACT OF THE DISCLOSURE

A box section frame member includes an upper channel-shaped member having the flanges partially telescoped into the flanges of a lower channel-shaped member. A weld connection is made at the upper edge of the lower channel-shaped member. The flanges of the lower channel-shaped member are formed with integral struck out tabs which project inwardly and are longitudinally spaced. The upper channel-shaped member is provided with correspondingly spaced openings located to mate with the tabs in the assembled relation. The tabs and opening are made during the formation of the channel members which are preassembled by press fitting of channel-shaped members with the flanges and web portions thereof deflecting to permit the movement of the openings past and into locking engagement with the tabs.

This invention is directed to a locking lance tab pre-assembly attachment system for a box-section frame member, and more particularly, to a lance tab and complementary recess which is preferably an opening or hole temporary connection between two channel members which are pre-assembled, transported and then welded together permanently to form a box-section frame member. The invention provides a means for holding the elements together while being transported to the welding fixture from the pre-assembly station. In addition, the lance and recess are disposed a fixed distance from the webs of the respective channel member components of the box-section member. The lance and hole sizes are designed for a suitable clearance in all directions so that the assembly locks together loosely. This feature allows the welding fixtures to shift and hold the parts in correct (or compensated) dimensional relationhip in any of a plurality of welding fixtures for final welding.

In the past, the pre-assembled box-section member was resistance welded together at the assembly station, prior to transporting it to the finish welding fixture. This procedure proved to be impractical, because the resistance welding effectively determined the dimensions of the box-section member, and it is very difficult to provide a final welding fixture, separate from the resistance welder, which has the same dimensions as the resistance welding fixture. In addition, it is most difficult to obtain consistent resistance spot welds. The resistance welding pre-assembly of box-section members caused considerable downtime, machine fixturing problems and resulted in considerable scrap steel, mantenance costs, loss of production, dimensional and weld quality problems and subsequent manufacturing problems.

The locking lance pre-assembly technique of the invention eliminates all of the above problems, without any additional expense. In addition, the resistance welding operation nad fixture is completely eliminated. The forming of the locking lances and the complementary recesses is done during the conventional steps of forming and piercing the two complementary channel members, so that no additional forming steps are required. No additional metal is required for the locking lances, or for the recesses when the lance tabs and the recesses are placed at non-critical areas of their respective flanges.

The invention provides a simple and reliable means for pre-assemblying a box-section frame element to facilitate transporting to the welding fixture, and loading into the welding fixture for welding.

The accompanying drawings illustrate the presently preferred method of carrying out the invention.

FIG. 1 is a perspective view of a pair of complementary channel members showing the locking lances and complementary recesses prior to the pre-assembly step;

FIG. 2 is a perspective view showing the pre-assembled box-section held together by the locking lances; and FIG. 3 is a sectional view (taken along line 3—3) of FIG. 2 through the locked lance, and showing the permanent weld added thereto.

As shown in the drawings, a first male (or inner) channel member 1 having a web 2 and a pair of flanges 3 and 4 is formed having a plurality of integral recesses 5 disposed at intervals throughout its length on the respective flanges 3 and 4. A second, complementary female (or outer) channel member 6, having a web 7 and a pair of flanges 8 and 9 is provided with a plurality of lances 10 which are disposed along the flanges 8 and 9, and are adapted to mate with the respective complementary recesses 5.

As shown in FIG. 2, the channel members 1 and 6 are pressed together to cause the lances 10 to lock in the associated recesses 5 to define a pre-assembled box-section member 11. Deflections in flanges 3, 4, 8 and 9 and in webs 2 and 7 accommodate the lance interference fit during pressing and spring back plus lance design prevents disassembly after completion of the assembly and engagement of lances and recesses. It can readily be appreciated that the pre-assembled box member 11 can be transported without welding or any other additional fastening to any appropriate welding fixture available for application of a permanent final weld 12, which can be applied in any suitable manner. The presently preferred means for applying weld 12 is by depositing a continuous consumable electrode along the edge of flanges 8 and 9 where they overlap flanges 3 and 4. The consumable electrode is shielded by $CO_2$ gas from the surrounding air.

The pre-assembled box-section member 11 has some degree of freedom in its external dimensions, thereby accommodating it to fit in any of a plurality of welding fixtures having approximately, but not precisely, the same fixturing dimensions prior to clamp-down to the desired precise dimensional relationship for welding.

The invention provides an inexpensive means for pre-assembling a box-section frame element and facilitates transporting of the frame member during the fabrication steps. It eliminates fixturing, quality and other (subsequent) manufacturing problems which result from rigid (such as resistance welding) pre-assembly methods.

Various modes of carrying out the invention are contemplated as being within the scope of the following claims particularly pointing out and distinctly claiming the subject matter which is regarded as the invention.

I claim:

1. A pre-assembly fastening means in a tubular member fabricated from a pair of complementary elements, each having at least one flange surface adapted to overlap the flange surface of the other element, comprising a female recess formed in the flange surface of the first of said complementary elements and a male protuberance in the flange surface of the second of said complementary elements, said pair of complementary elements being constructed with a predetermined clearance therebetween and adapted to be press-fit together whereby the male protuberance extends into said recess and loosely locks said complementary elements together in a pre-assembled tubular member.

2. The fastening means of claim 1, in which the male protuberance comprises a lance tab formed integrally with a portion of said flange surface, and in which said complementary elements include an opening larger than said tab to establish a loose fit therebetween and permit variance of the external dimensions of said pre-assembled tubular member to compensate for fixture variation between the pre-assembled part and the welding fixture at the final assembly station.

3. A metal box-section element including two components having overlapping flange surfaces in a vehicle frame including a pre-assembly fastening means comprising a recess disposed in the inner flange surface at the area of overlap, and a metal tongue formed integrally with said outer flange surface and disposed coaxially with said recess, said metal tongue having lateral dimensions smaller than said recess and extending into said recess to loosely secure the two components together into a metal box-section element, said pre-assembly fastening means providing a temporary mechanical locking connection between said components to facilitate transporting the metal box-section element prior to welding.

4. A metal box-section comprising, a pair of channel members each having a pair of longitudinally extending flanges joined by a web, a plurality of openings disposed in the flanges of one of said channel members, with each opening being disposed between the longitudinal edge of the respective flange and the web, each recess being spaced a predetermined distance from the adjacent flange edge, and a plurality of complementary tabs integrally lanced in the other of said channel members between the longitudinal edge of the respective flange and the web and spaced a predetermined distance from the corresponding flange edge, said tabs each being adapted to be press-fit into an associated recess, whereby said pair of channel members are locked together to define a metal box section.

5. A metal box section comprising first and second channel members, each having spaced flanges joined by a web, a plurality of recesses disposed in the flanges of the first channel members, and a plurality of integral protuberances extending inwardly from the inner flange surfaces of the second channel member, said recesses and protuberances being spaced inwardly of the corresponding edge of the respective flanges, said first channel member being press-fit to partially nest inside said second channel member with the respective flanges overlapping sufficiently to cause said integral protuberances to engage and lock in the associated recesses to define a metal box section which may be transported prior to welding.

6. A method of forming a box section from first and second channel members, each channel member having a pair of longitudinally extending flanges joined by a web with the one set of flanges of one member being disposed to telescope into the flanges of the second member, the steps comprising forming a first flat metal blank into a first channel member while simultaneously forming a plurality of female recesses in the respective flanges, forming a second flat metal blank into a second channel member while simultaneously forming a plurality of male protuberances, in the respective flanges, said protuberances being spaced complementary to said recesses, press-fitting said first and second channel members together with said flanges and webs providing deflection to permit said recesses to move into alignment with said protuberances to lock the protuberances in associated recesses, transporting the box section so formed in the pre-assembled condition to a welding fixture, and welding the overlapping edges of the respective flanges to the adjacent flange.

References Cited

UNITED STATES PATENTS

| | | | |
|---|---|---|---|
| 1,651,936 | 12/1927 | Swift | 232—4 |
| 1,812,151 | 6/1931 | Jacocks. | |
| 1,848,715 | 3/1932 | Hart et al. | 29—453 |
| 1,995,616 | 3/1935 | Kamack | 29—470.5 X |
| 2,136,122 | 11/1938 | Almdale | 52—731 X |
| 2,843,725 | 7/1958 | Granberg | 52—731 X |

BOBBY R. GAY, *Primary Examiner.*

A. M. CALVERT, *Assistant Examiner.*

U.S. Cl. X.R.

29—155, 470.5